(12) United States Patent
He

(10) Patent No.: US 9,836,775 B2
(45) Date of Patent: Dec. 5, 2017

(54) SYSTEM AND METHOD FOR SYNCHRONIZED WEB SCRAPING

(71) Applicant: Ficstar Software, Inc., Markham (CA)

(72) Inventor: Wei He, Richmond Hill (CA)

(73) Assignee: FICSTAR SOFTWARE, INC., Markham, Ontario (CA)

( * ) Notice: Subject to any disclaimer, the term of this patent is extended or adjusted under 35 U.S.C. 154(b) by 57 days.

(21) Appl. No.: 13/901,879

(22) Filed: May 24, 2013

(65) Prior Publication Data

US 2014/0351091 A1    Nov. 27, 2014

(51) Int. Cl.
*G06Q 30/00*    (2012.01)
*G06Q 30/06*    (2012.01)

(52) U.S. Cl.
CPC .............................. *G06Q 30/0625* (2013.01)

(58) Field of Classification Search
CPC .................................................. G06Q 30/0625
See application file for complete search history.

(56) References Cited

U.S. PATENT DOCUMENTS

| | | | |
|---|---|---|---|
| 7,082,426 B2 * | 7/2006 | Musgrove et al. | |
| 2006/0218146 A1 * | 9/2006 | Bitan | G06F 17/30864 |
| 2012/0203760 A1 * | 8/2012 | Abraham et al. | 707/710 |

\* cited by examiner

*Primary Examiner* — Jason Dunham
*Assistant Examiner* — Anand Loharikar

(57) ABSTRACT

A method includes obtaining information associated with a product, service, or event. The method also includes scraping data based on the obtained information substantially concurrently from two or more web pages associated with websites that list a same product, service, or event to produce scraped data for the same product, service, or event from each corresponding web page at substantially a same time.

20 Claims, 3 Drawing Sheets

SYSTEM AND METHOD FOR SYNCHRONIZED WEB SCRAPING

TECHNICAL FIELD

This disclosure is generally directed to a system and method for synchronized web scraping.

BACKGROUND

Web scraping is a computer software technique of extracting information from websites. Improved web scraping techniques are desirable.

SUMMARY

This disclosure provides a synchronized scraper for substantially concurrently scraping web pages that each list the same item from different websites. By using information collected for the same item from different websites at substantially the same time, more accurate data for comparing the item listed on the web pages may be obtained. In particular, this disclosure describes a system, a method, and a computer readable medium supporting the synchronized scraper.

In a first embodiment, a method includes obtaining information associated with a product, service, or event. The method also includes scraping data based on the obtained information substantially concurrently from two or more web pages associated with websites that list a same product, service, or event to produce scraped data for the same product, service, or event from each corresponding web page at substantially a same time.

In a second embodiment, an apparatus includes at least one processing device configured to obtain information associated with a product, service, or event. The processing device is also configured to scrape data based on the obtained information substantially concurrently from two or more web pages associated with websites that list a same product, service, or event to produce scraped data for the same product, service, or event from each corresponding web page at substantially a same time.

In a third embodiment, a non-transitory computer readable storage medium includes instructions that, when executed by at least one processing device, cause the at least one processing device to obtain information associated with a product, service, or event. The computer readable storage medium includes instructions that, when executed by the at least one processing device, cause the at least one processing device to scrape data based on the obtained information substantially concurrently from two or more web pages associated with websites that list a same product, service, or event to produce scraped data for the same product, service, or event from each corresponding web page at substantially a same time.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
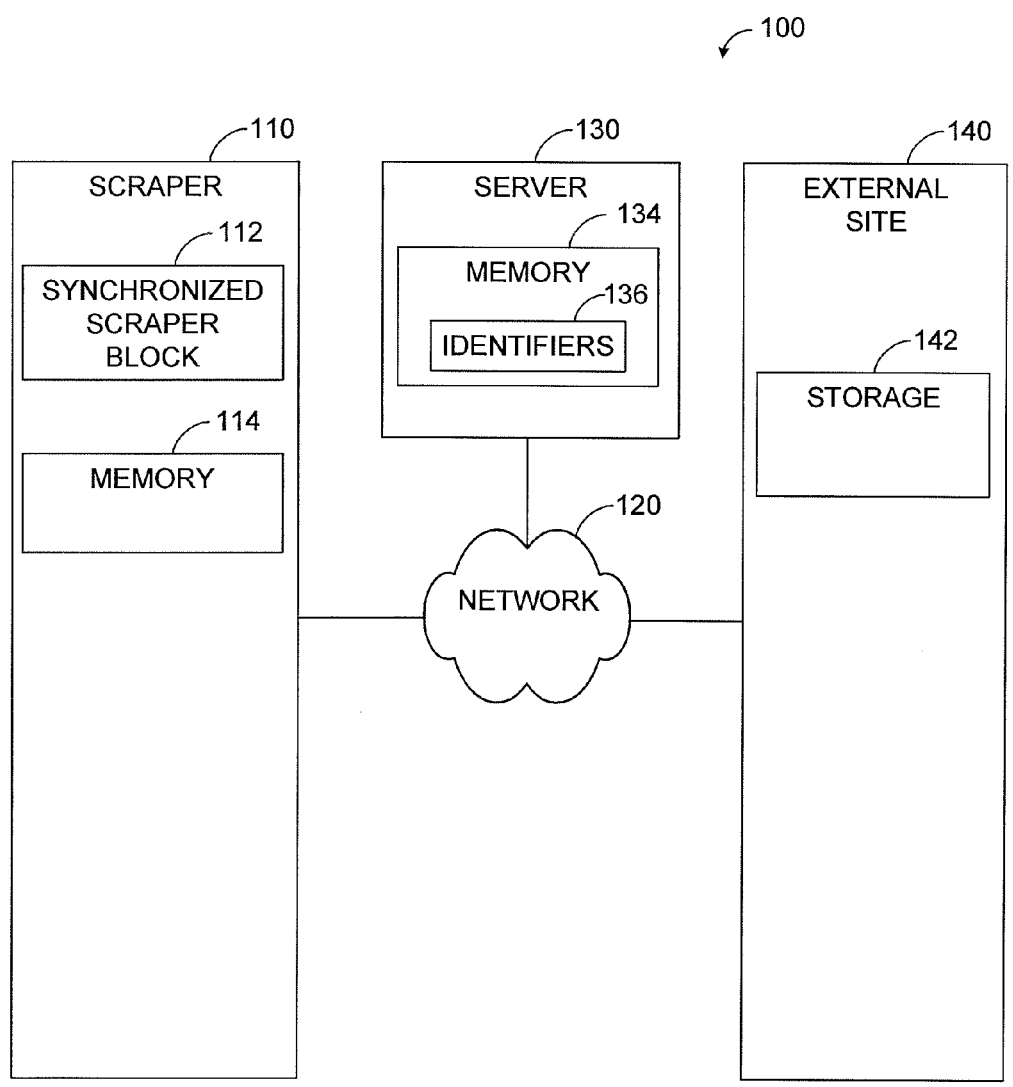
FIG. 1 is a block diagram that illustrates an example system that is used for synchronized web scraping according to an embodiment of this disclosure.
Figure 2:
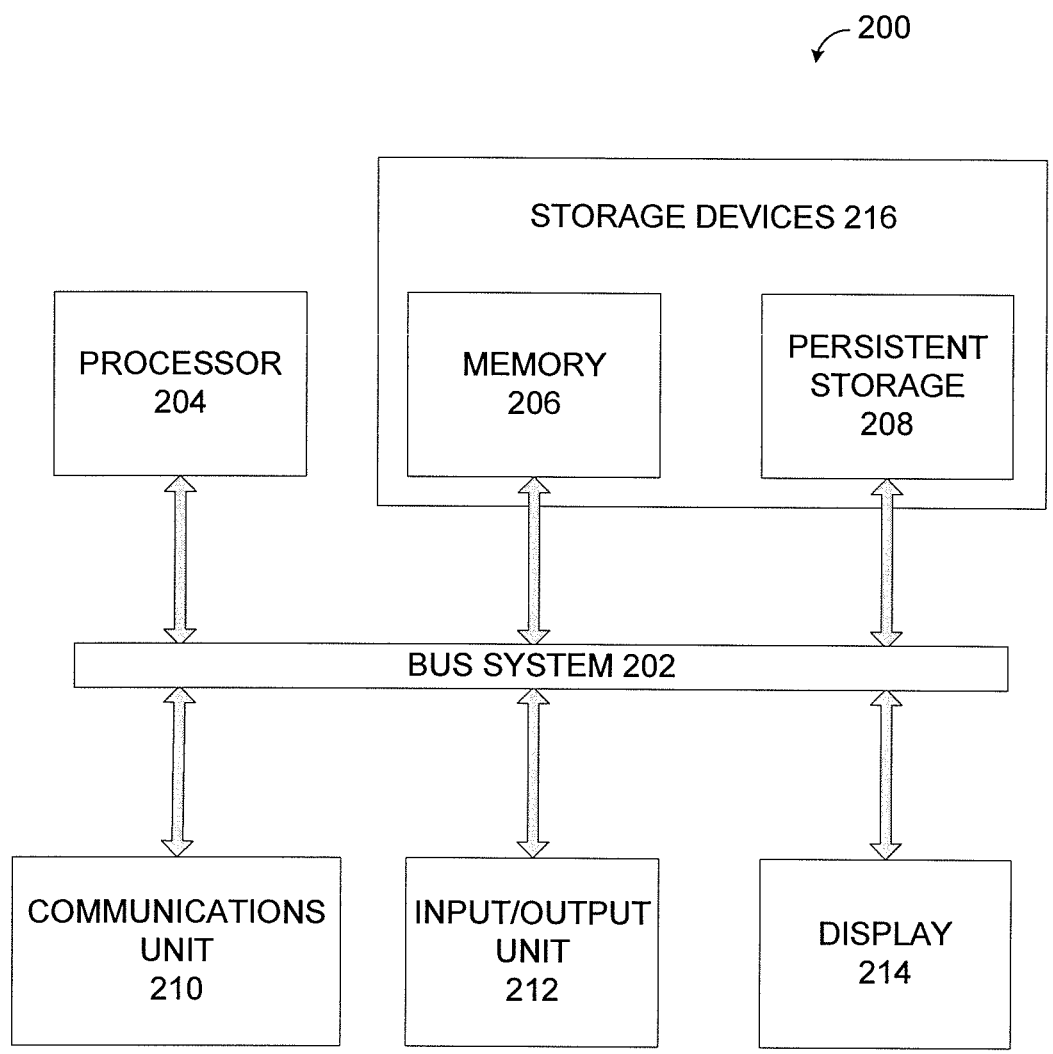
FIG. 2 illustrates an example device that can be used in the example system of FIG. 1 according to an embodiment of this disclosure.
Figure 3:
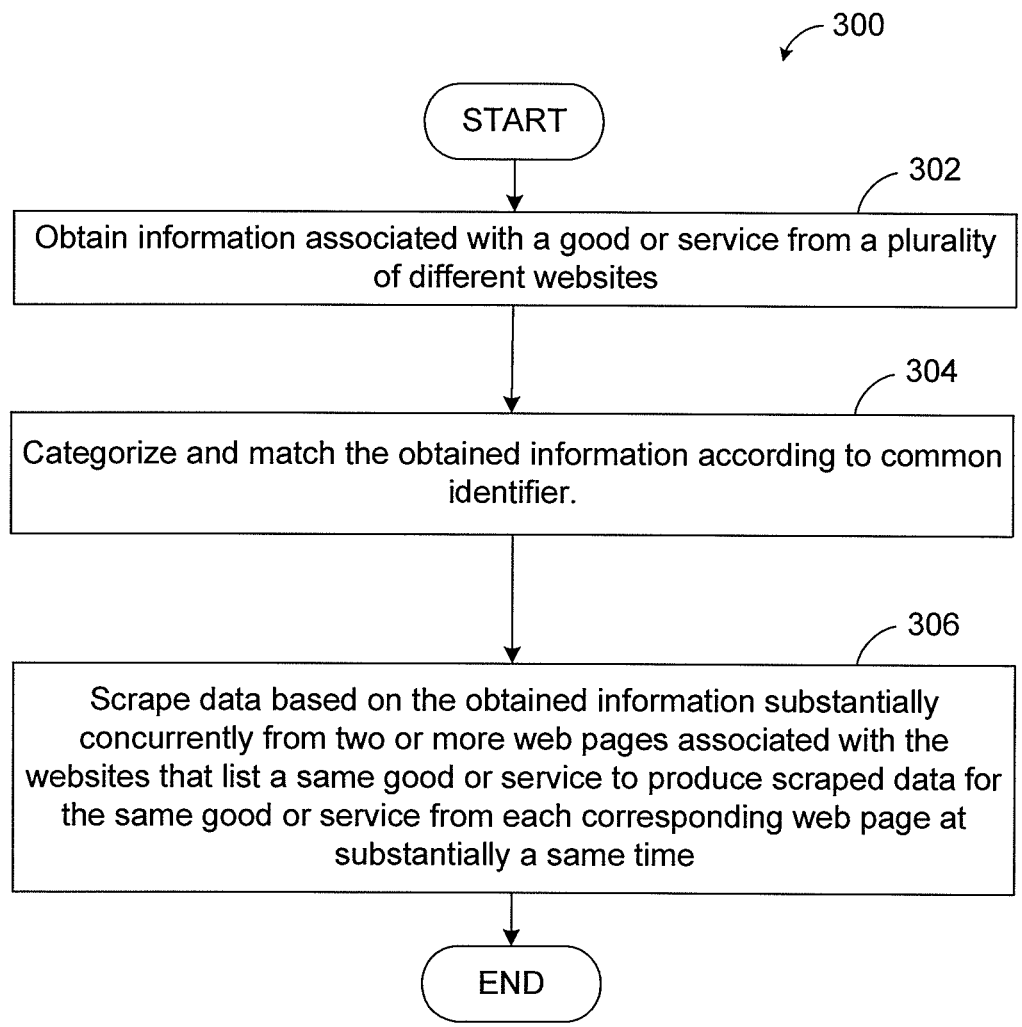
FIG. 3 illustrates an example method for synchronized web scraping according to an embodiment of this disclosure.

FIGS. 1 through 3, discussed below, and the various embodiments used to describe the principles of the present disclosure in this patent document are by way of illustration only and should not be construed in any way to limit the scope of the invention. Those skilled in the art will understand that the principles of the present invention may be implemented in any type of suitably arranged device or system.

FIG. 1 is a block diagram that depicts an example system 100 that may be used for synchronized web scraping, according to an embodiment of this disclosure. The system 100 includes a scraper 110, a network 120, and a server 130, in communication with an external site 140.

The scraper 110 may be any computing device that is capable of performing a synchronized web scraping operation. For example, the scraper 110 may be a server, a desktop computer, or a handheld device, such as a laptop computer, tablet computer, or smart phone. In the illustrated embodiment, the scraper 110 includes a synchronized scraper block 112 and a memory 114. The synchronized scraper block 112 is configured to substantially concurrently scrape data from two or more web pages that each list the same product, service, or event to produce scraped data for the same product, service, or event from each corresponding web page at substantially the same time. The synchronized scraper block 112 may be implemented in software (e.g., software code), hardware (e.g., one or more processors, controllers, storage devices, and circuitry), or any combination of software and hardware. The scraper 110 may be further capable of receiving input from a user and displaying data associated with a web scraping operation, e.g., via a user interface.

As used throughout this disclosure, the term "product, service, or event" refers to any type of product (e.g., a tangible or digital product or good, etc.), service (e.g., a professional or consumer service, etc.), event (e.g., a sporting event, movie, TV show, streaming media event, and the like), media (e.g., a news article, publication, social media content, and the like), or other item that may be available for sale, trade, lease, sharing, consumption, comment, review, or otherwise experience, on two or more websites.

The memory 114 may be configured to store information, such as data, program code, and/or other suitable information on a temporary or permanent basis. For example, the memory 114 may be configured to store data and program code associated with a synchronized web scraping operation. The memory 114 may be a random access memory or other volatile or non-volatile storage device(s).

The scraper 110 may include communication technology (such as wireless technology) for sharing information with other devices. The scraper 110 may include a variety of integrated user interface units or may be coupled to user interface units through one or more communication ports or data links of the device. Examples of user interface units include a voice input unit (such as a microphone) and physical input units (such as a keyboard, a mouse, a track ball, a rotary dial or wheel, a touchpad, or a touch-screen). Any of these user interface units may be implemented as an external unit that communicates with the scraper 110 to provide user input using a wired or wireless communication technology. Examples of wired communication technology include Universal Serial Bus (USB) interface, FireWire interface, etc. Examples of wireless communication technology include Bluetooth, Wi-Fi, WiMax, and infrared. Through these user interface units, the scraper 110 may receive physical or voice inputs from the user. The scraper 110 is equipped with communications software, including a World Wide Web browser that allows a user to connect to and use on-line searching services via the Internet.

The server 130 is illustrative of a general purpose or other computing device operating as a local or remote server configured to communicate with, and share data with, the synchronized scraper block 112 on the scraper 110. The server 130 is configured to communicate with one synchronized scraper block 112 on one scraper 110, or multiple synchronized scraper blocks 112 on multiple scrapers 110, or on any other device(s) on which the synchronized scraper block 112 may be deployed for use as described herein. The server 130 includes a memory 134 and identifiers 136. The memory 134 may be configured to store information, such as data, program code, and/or other suitable information on a temporary or permanent basis. The memory 134 may be a random access memory or other volatile or non-volatile storage device(s). The identifiers 136 may be stored in the memory 134 and information associated with a product, service, or event obtained from one or more websites may be categorized in accordance with the identifiers 136.

The external site 140 is illustrative of a web server of a provider of a product, service, or event. Information associated with the provider and the provider's products, services, or events is stored in a storage unit 142. The storage unit 142 may include a memory configured to store the associated information.

According to an embodiment, all functionality and data storage associated with the synchronized scraper block 112 may take the form of a synchronized scraper application or module having sufficient computer-executable instructions for performing the functions described herein. The synchronized scraper application or module may be resident on the scraper 110 for use in association with data accessible by the scraper 110. Alternatively, the functionality and associated data for the synchronized scraper block 112 may be maintained and operated at the server 130.

Communication between the scraper 110, the server 130, and the external site 140 is made possible via the network 120. The network 120 may be implemented by any medium or mechanism that provides for the exchange of data between various computing devices. Examples of such a network include a Local Area Network (LAN), Wide Area Network (WAN), Ethernet or the Internet, or one or more terrestrial, satellite, or wireless links. The network 120 may include a combination of networks such as those described. The network 120 may transmit data according to Transmission Control Protocol (TCP), User Datagram Protocol (UDP), and/or Internet Protocol (IP). Although a single scraper 110, a single server 130, and a single external site 140 are shown for ease of illustration, the network 120 may provide communication between the scraper 110 and multiple servers 130 and multiple external sites 140, may provide communication between multiple scrapers 110 and multiple servers 130 and multiple external sites 140, may provide communication between multiple scrapers 110 and the server 130 and the external site 140, or any combination thereof. For example, multiple scrapers 110 may be employed to perform web scraping substantially concurrently and in a manner that the multiple scrapers 110 are synchronized with each other.

In one aspect of operation, the scraper 110 may obtain information associated with products and/or services from various websites, such as the external site 140. The information may be obtained in various ways, such as by a crawling operation performed by a web crawler, by information input directly by a user, or by an initial scraping operation as non-limiting examples. The obtained information may be categorized in accordance with the identifiers 136 and stored in the memory 134. For example, information associated with a particular book may be obtained from multiple websites and the obtained information may be categorized in accordance with one or more identifiers, such as a website name, a title of the book, a price of the book, an international standard book number (ISBN) for the book, or a uniform resource locator (URL) of the web page of the website that lists the book as non-limiting examples. The categorized information may be stored in the memory 134. As another example, information associated with a particular hotel may be obtained from multiple websites and the obtained information may be categorized in accordance with one or more identifiers, such as a hotel name, a room description, check in date and check out date, or a price of the room as non-limiting examples. Alternatively, or in addition, the obtained information may be categorized in accordance with one or more identifiers associated with social media monitoring, such as a number of likes and dislikes, a number of reviews, a number of tweets, or rating information as non-limiting examples.

During operation, the scraper 110 may communicate with one or more external sites 140 via the network 120 to obtain information associated with a product, service, or event from a plurality of different websites. For example, a first external site 140 may host a first website associated with a product, service, or event and may include information in its storage unit 142 associated with the product, service, or event that may be obtained by the scraper 110, and a second external site 140 may host a second website different from the first website associated with the same product, service, or event and may include information in its storage unit 142 associated with the same product, service, or event that may be obtained by the scraper 110. The obtained information may be categorized in accordance with the identifiers 136 and stored in the memory 134.

For example, information obtained from each of the first and second external sites 140 regarding the same item may be categorized in accordance with the identifiers 136 and stored in the memory 134. As a particular example, information regarding a book may include a title of the book, an ISBN of the book, a price of the book, and a URL of the web page that lists the book. The information of the book from each of the multiple external sites 140 may be categorized by the ISBN, which may be used as the identifier for the book, since the ISBN should be common across the multiple external sites 140. Data may be scraped based on the obtained information substantially concurrently from two or more different web pages that each list the same product, service, or event. For example, the synchronized scraper block 112 (or multiple synchronized scraper blocks 112) may substantially concurrently scrape data from two or more web pages that have been categorized in accordance with the identifiers 136 and that each list the same product, service, or event. The data scraping may produce scraped data for the same product, service, or event from each corresponding web page at substantially the same time. To illustrate, pricing data of the same item (e.g., a book or a computer) may be scraped from two different web pages at substantially the same time. The scraped data (e.g., pricing data) for the same item from each corresponding web page may be compared to produce a comparison result, resulting in a more accurate pricing comparison between the item being sold on a first web page and the same item being sold on a different second web page because the pricing data is retrieved at substantially the same time. In other embodiments, the data scraping may produce scraped data to enable web page change monitoring, such as when a new product, service, or event has been added or deleted from a web page.

The scraped data and/or the comparison results may be stored on the scraper 110 or on the server 130 or may be synchronized to both. If the scraped data and/or the comparison results are stored on the server 130, the synchronized scraper block 112 may retrieve the scraped data and/or the comparison results from the server 130 in response to, for example, input from a user.

FIG. 2 illustrates an example device 200 that can be used in the system 100 in accordance with this disclosure. The device 200 could represent either the scraper 110 or the server 130 in FIG. 1.

In this example, the device 200 includes a bus system 202. The bus system 202 supports communication between a processing unit 204, a memory 206, a persistent storage 208, a communications unit 210, an input/output (I/O) unit 212, and a display or display interface 214. Any suitable bus or buses could be used here.

The processing unit 204 processes software instructions loaded into the memory 206. The processing unit 204 may include a single processor, multiple processors, one or more multi-processor cores, or other type of processor depending on the particular implementation. As an example, the processing unit 204 may be implemented using a number of heterogeneous processor systems in which a main processor is present with secondary processors on a single chip. As another example, the processing unit 204 may be a symmetric multi-processor system containing multiple processors of the same type. Any suitable processing device(s) could be used.

The memory 206 and the persistent storage 208 are examples of storage devices 216. A storage device is any piece of hardware capable of storing information, such as data, program code, and/or other suitable information on a temporary or permanent basis. The memory 206 may be a random access memory or other volatile or non-volatile storage device(s). The persistent storage 208 may contain one or more components or devices, such as a hard drive, flash memory, optical disc, or other persistent storage device(s). A storage device may be fixed or removable, such as when a removable hard drive or USB thumb drive is used.

The communications unit 210 provides for communications with other systems or devices. For example, the communications unit 210 could include a network interface card or a wireless transceiver. The communications unit 210 may provide communications through physical or wireless communications links.

The I/O unit 212 allows for input and output of data using other components connected to or integrated within the device 200. For example, the I/O unit 212 may provide a connection for user input through a keyboard, mouse, or other input device. The I/O unit 212 may also send output to a display, printer, or other output device. The I/O unit 212 could alternatively include a keyboard, mouse, or other input or output device(s). If the device 200 includes a display 214, the display 214 provides a mechanism to visually present information to a user. The display 214 could represent a touchscreen.

Program code for an operating system, applications, or other programs may be located in the storage devices 216, which are in communication with the processing unit 204 through the bus system 202. Instructions forming the programs may be loaded into the memory 206 for processing by the processing unit 204.

Although FIG. 2 illustrates one example of a device 200 that can be used in the system 100, various changes may be made to FIG. 2. For example, FIG. 2 is simply meant to illustrate possible components in one specific implementation. Each of the components 110, 130 in FIG. 1 could be implemented in other ways, such as other ways that incorporate one or more processing units, one or more memory units storing data and instructions used/generated/collected by the processing unit(s), and one or more interfaces for communicating over the network 120.

FIG. 3 illustrates an example method 300 for synchronized web scraping. The method 300 could, for example, be performed by the scraper 110 of FIG. 1.

Information associated with a product, service, or event may be obtained from multiple external sources at step 302. Obtaining, as used herein, can include loading from storage, receiving from another device or process, or obtaining via an interaction with a user. For example, uniform resource locators (URLs) of a plurality of different web pages that include the same product, service, or event may be input by a user of the scraper 110. As another example, two or more external sites 140 of FIG. 1 may each host a different website associated with the product, service, or event and may include information in its respective storage unit 142 of FIG. 1 associated with the product, service, or event. The information may be obtained from the websites by a crawling operation, by information input directly by a user, or by an initial web scraping operation. The obtained information may include a uniform resource locator (URL) for the product, service, or event.

At step 304, the obtained information may be categorized and matched in accordance with the identifiers 116 of FIG. 1 stored in the memory 114 of FIG. 1. For example, the obtained information from two or more different websites is compared based on the identifiers to determine whether the websites list the same product, service, or event. As a particular example, information of a book (including URL information) obtained from two or more different websites may be organized and matched according to the ISBN of the book.

Later, at step 306, data may be scraped based on the obtained information substantially concurrently from two or more web pages associated with the websites that list a same product, service, or event to produce scraped data for the same product, service, or event from each corresponding web page at substantially a same time. For example, upon occurrence of a trigger condition, the synchronized scraper block 112 may retrieve from the memory 134 the URLs for the same product, service, or event at two or more web sites that each list the product, service, or event. Then, using the retrieved URLs, the synchronized scraper block 112 may substantially concurrently scrape data for the product, service, or event from the two or more web pages. To illustrate, pricing data of the same book (identified by the ISBN) may be scraped from two different web pages at substantially the same time. The scraped data (e.g., pricing data) for the same product, service, or event from each corresponding web page may be compared to produce a comparison result, resulting in a more accurate pricing comparison between the product, service, or event being sold on a first web page and the same product, service, or event being sold on a second web page that is different from the first web page because the pricing data is generated at substantially the same time.

The trigger condition that triggers the synchronized scraping operation may be any one of multiple trigger conditions. For example, the trigger condition may be a request by a user for price information of a product, service, or event from multiple websites. Alternatively, the trigger condition may be an occurrence of a recurring time event. That is, the synchronized scraping operation may be scheduled to occur according to a predetermined schedule, such as daily or hourly. As another alternative, the trigger condition may be detection of a change, such as a pricing change, at one of the multiple web sites. Regardless of the trigger condition, the synchronized scraping operation provides substantially concurrent data retrieval for a product, service, or event from the multiple external sites because the identifiers for the product, service, or event have been already obtained from the multiple external sites, and categorized and stored in advance on the server 130.

Although FIG. 3 illustrates one example of a method 300 for synchronized web scraping, various changes may be made to FIG. 3. For example, while shown as a series of steps, various steps shown in FIG. 3 could overlap, occur in parallel, or occur multiple times. Moreover, some steps could be combined or removed and additional steps could be added.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The turns "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining, by at least one processing device, information associated with a product, service, or event from each of two or more web pages associated with websites that list the product, service, or event;
determining, by the at least one processing device, that at least some of the information associated with the product, service, or event has changed at at least one of the two or more web pages;
in response to the determining that the at least some information associated with the product, service, or event has changed at the at least one of the two or more web pages, performing synchronized scraping, by the at least one processing device, based on the obtained information, the synchronized scraping performed concurrently from the two or more web pages to obtain scraped data of the same type for the same product, service, or event from each corresponding web page at a same time;
producing, by the at least one processing device, a comparison result based on a comparison of the scraped data for the same product, service, or event from each corresponding web page; and
presenting the comparison result on a graphical user interface.

2. The method of claim 1, wherein obtaining information includes obtaining a uniform resource locator (URL) associated with the product, service, or event.

3. The method of claim 1, further comprising categorizing the obtained information in accordance with one or more identifiers associated with the product, service, or event.

4. The method of claim 3, further comprising comparing the obtained information based on the one or more identifiers to determine whether the websites list the same product, service, or event.

5. The method of claim 3, wherein the one or more identifiers include a book title or an international standard book number (ISBN).

6. The method of claim 3, wherein the one or more identifiers include a price and wherein the scraped data includes real-time price data.

7. The method of claim 1, further comprising receiving search inquiries for the product, service, or event at the graphical user interface.

8. The method of claim 1, wherein the scraped data is received via an internet connection coupled to the at least one processing device.

9. An apparatus comprising:
at least one processing device configured to:
obtain information associated with a product, service, or event from each of two or more web pages associated with websites that list the product, service, or event;

determine that at least some of the information associated with the product, service, or event has changed at at least one of the two or more web pages;

in response to the determination that the at least some information associated with the product, service, or event has changed at the at least one of the two or more web pages, perform synchronized scraping of data based on the obtained information, the synchronized scraping performed concurrently from the two or more web pages to obtain scraped data of the same type for the same product, service, or event from each corresponding web page at a same time;

produce a comparison result based on a comparison of the scraped data for the same product, service, or event from each corresponding web page; and present the comparison result on a graphical user interface.

10. The apparatus of claim 9, wherein obtaining information includes obtaining a uniform resource locator (URL) associated with the product, service, or event.

11. The apparatus of claim 9, wherein the at least one processing device is further configured to categorize the obtained information in accordance with one or more identifiers associated with the product, service, or event.

12. The apparatus of claim 11, wherein the at least one processing device is further configured to compare the obtained information based on the one or more identifiers to determine whether the websites list the same product, service, or event.

13. The apparatus of claim 11, wherein the one or more identifiers include a book title or an international standard book number (ISBN).

14. The apparatus of claim 11, wherein the one or more identifiers include price and wherein the scraped data includes real-time price data.

15. The apparatus of claim 9, wherein the at least one processing device is further configured to:

receive search inquiries for the product, service, or event at the graphical user interface.

16. The apparatus of claim 9, wherein the scraped data is received via an internet connection coupled to the at least one processing device.

17. A non-transitory computer readable storage medium comprising instructions that, when executed by at least one processing device, cause the at least one processing device to:

obtain information associated with a product, service, or event from each of two or more web pages associated with websites that list the product, service, or event;

determine that at least some of the information associated with the product, service, or event has changed at at least one of the two or more web pages;

in response to the determination that the at least some information associated with the product, service, or event has changed at the at least one of the two or more web pages, perform synchronized scraping of data based on the obtained information, the synchronized scraping performed concurrently from the two or more web pages to obtain scraped data of the same type for the same product, service, or event from each corresponding web page at a same time;

produce a comparison result based on a comparison of the scraped data for the same product, service, or event from each corresponding web page; and present the comparison result on a graphical user interface.

18. The computer readable storage medium of claim 17, further comprising instructions that, when executed by the at least one processing device, cause the at least one processing device to obtain a uniform resource locator (URL) associated with the product, service, or event.

19. The computer readable storage medium of claim 17, further comprising instructions that, when executed by the at least one processing device, cause the at least one processing device to:

receive search inquiries for the product, service, or event at the graphical user interface.

20. The computer readable storage medium of claim 17, wherein the scraped data is received via an internet connection coupled to the at least one processing device.

* * * * *